United States Patent Office

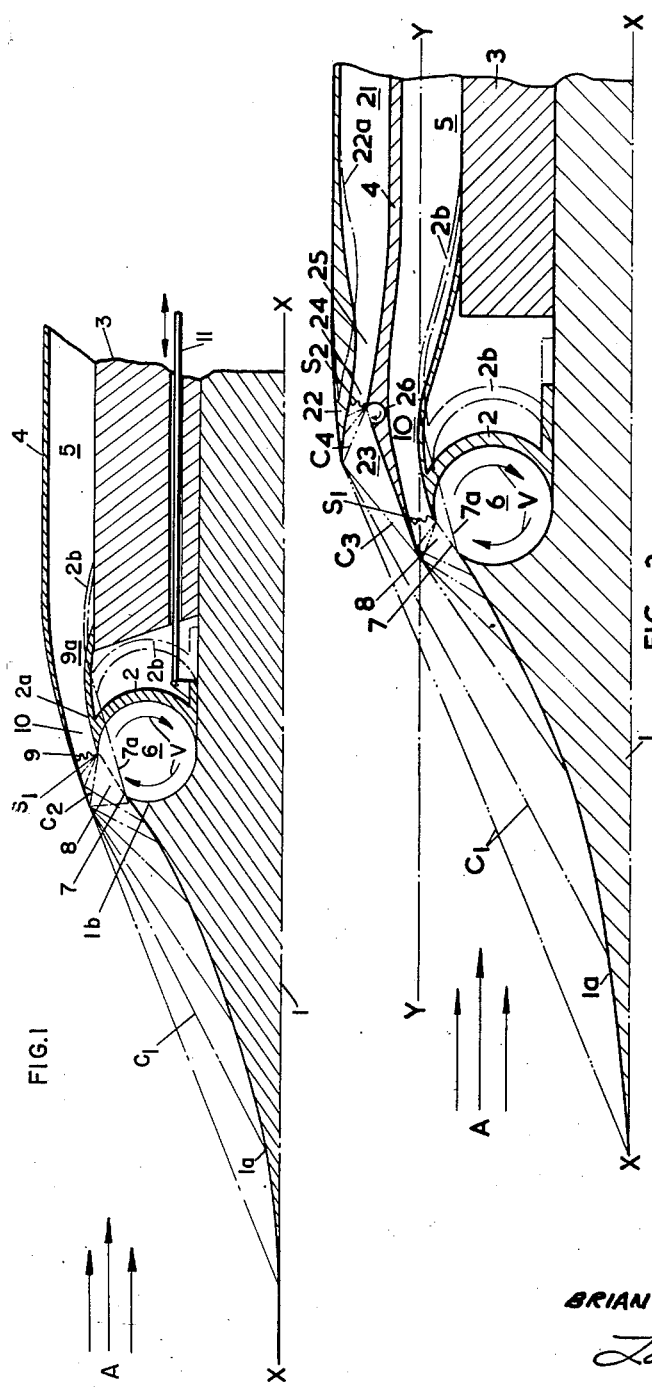

3,066,483
Patented Dec. 4, 1962

3,066,483
INTAKE FOR SUPERSONIC FLOW
Brian Stapleton Stratford, Aldershot, England, assignor to Power Jets (Research and Development) Limited, London, England, a British company
Filed June 6, 1960, Ser. No. 34,212
Claims priority, application Great Britain June 19, 1959
3 Claims. (Cl. 60—35.6)

The present invention relates to intakes for supersonic flow, and particularly though not exclusively to air intakes for aircraft designed to fly at supersonic speeds.

The invention is more specifically concerned with the improvement of the performance of such intakes by the use of so called "vortex bearings." By a vortex bearing is meant a zone of rotating fluid, or a vortex, a peripheral portion of which defines a part of a boundary for a main fluid stream in place of a solid boundary wall. The use of such vortex bearings in association with aerofoil surfaces and boundary walls of ducts has already been proposed.

According to the present invention there is provided an intake for supersonic flow comprising, in the direction of flow, a convergent section, a throat and a divergent section, wherein a bounding wall of the intake is formed with two opposed cusp portions spaced from one another in the direction of flow and defining between them an undercut recess shaped to permit the formation therein of a vortex bearing, a peripheral portion of the bearing forming part of the bounding wall of the intake at a position upstream of the throat.

According to a feature of the invention the tip of the downstream cusp portion lies at the throat.

According to another feature of the invention, the cusp portions are movable relative to one another in the direction of flow.

Two embodiments of the invention as applied to the air intakes of jet propulsion engines intended for use in aircraft designed for supersonic flight will now be described by way of example with reference to the accompanying drawings, of which:

FIGURE 1 is an axial half section of an intake of the external-compression type, FIGURE 2 is an axial half section of an intake of the external-compression two stream type.

The intake of FIGURE 1 is axi-symmetric with respect to axis XX and comprises a center body including a forward portion 1, a sleeve member 2 and a rearward portion 3. The center body is coaxially mounted in spaced relationship with an outer annular wall 4, and defines therewith an annular passage 5 which leads to a jet propulsion engine, e.g. a gas turbine or ram jet engine (not shown). The forward portion 1 of the center body protrudes beyond or upstream of the forward edge of wall 4 and is contoured at 1a (in known manner) to provide for external compression of the oncoming supersonic air stream impinging thereon (as indicated by arrow A), and to direct the resultant compression waves $C_1$ towards the forward edge of the outer wall 4.

The forward portion 1 of the center body and the sleeve 2 are formed with opposed cusp portions 1b, 2a spaced in the direction of flow, pointing towards one another and defining between them a substantially circular-section undercut recess 6. The flow of the air stream into the intake over the open side of this recess will induce rotation of the air in the recess in the sense indicated by the arrows V, and this rotating fluid constitutes a vortex bearing, a peripheral portion thereof (indicated by broken line 7) forming part of the bounding wall for the flow.

The inturned forward part of the outer wall 4 and the peripheral portion 7 of the vortex bearing define between them a convergent passage 8 which is outwardly inclined with respect to axis XX and leads to an outwardly directed throat 9 defined on one side by the tip of cusp portion 2a. The rear portion of the sleeve 2 is shaped to form with the outer wall 4 a divergent passage 10. The convergent passage is shaped so that further compression waves $C_2$ are directed towards the tip of cusp portion 2a, whereby internal compression of the flow is effected, while a normal shock $S_1$ is established at the throat 9. Further subsonic diffusion then occurs in the divergent passage 10.

It will be seen that the intake of FIGURE 1 operates with both external and internal compression under design conditions. When, however, the intake is to operate at transonic speeds and at supersonic speeds below the design value, in particular, during acceleration, it is a requirement that the intake throat area shall be increased to reduce drag and, in the case of an intake supplying a gas turbine engine, to allow the engine to operate at its optimum rotational speed. Moreover there should be little or no internal compression so that the intake may be started, i.e. the proper flow established. Thus provision is made for so varying the configuration of the intake that the area of throat 9 may be increased and the convergence of the passage 8 and hence the internal compression reduced or eliminated simultaneously.

The sleeve 2 is accordingly mounted for sliding movement with respect to the parts 1, 3 of the center body, movement being effected by an operating rod 11. The sleeve may thereby be withdrawn to the position indicated in chain dotted lines at 2b so that the recess 6 is enlarged. The peripheral portion of the vortex bearing bounding the flow path into the inlet then assumes the shape indicated by broken line 7a and the convergence of passage 8 is reduced or eliminated. Moreover the movement of sleeve 2 relative to the outer wall 3 increases the throat area as indicated at 9a. The vortex bearing makes it possible to achieve the required variation of intake configuration without the necessity for a complicated mechanical construction.

The intake of FIGURE 2 is of two stream type, and as regards the entry to the inner air intake passage 5 is substantially the same as the embodiment of FIGURE 1, like reference numerals being used for corresponding parts. The outer air intake passage 21 is defined between the outer wall 4 of the passage 5 and a shroud 22. This shroud has an outer face which is substantially cylindrical and parallel to axis XX, and its forward edge is arranged to intercept the compression waves $C_1$ arising from the center-body surface 1a and also compression waves $C_3$ from the forward edge of wall 4. The outer surface of the forward part of wall 4 is conical and it cooperates with the inner surface of shroud 22 to define a convergent passage 23 leading to a throat 24, compression waves $C_4$ being propagated in the passage 23 and a normal shock $S_2$ being established at the throat 24. The inner surface of shroud 22 and the outer surface of the wall 4 are also shaped to define a divergent passage 25 in which subsonic diffusion can take place.

As before, it is necessary to be able to increase the area of throat 24 and reduce or eliminate the internal compression in passage 23. Accordingly the shroud 22 is telescopically mounted with respect to a fixed rearward part (not shown) so that it can be withdrawn to the position indicated in chain dotted lines at 22a. Such movement is effected simultaneously with the rearward movement of sleeve 2. To effect the required change of intake configuration in this way, it is found necessary for the throat 24 and the divergent passage 25 to be inclined somewhat inwardly towards the axis XX as shown. It will be seen that this entails some inward inclination of the divergent passage 10. Since the convergent passage 23 is necessarily inclined outwardly, there may be a somewhat abrupt change of contour in the outer surface of the wall 4 adjacent the throat 24, and to promote a corresponding change in direction of flow, the outer surface is formed with an undercut recess 26 in which is set up a vortex bearing, the tip of the downstream cusp defining the inner edge of the throat 24.

The two air intake passages may be connected to supply the inner and outer flow passages of a gas turbine engine of the by-pass or ducted fan type, or two coaxial ram jet combustion chambers for discharging propulsive jet streams in parallel. Alternatively the inner passage might supply a gas turbine engine and the outer passage a ram jet combustion chamber.

The outer air intake passage just described could serve as a sole intake for a jet propulsion engine. The wall 4 would then be the center body with the forward part of its outer surface shaped to promote external compression and the intake would be axi-symmetric with respect to axis YY.

The intakes described above are axi-symmetric, but it will be understood that the invention is equally applicable to a two-dimensional intake. The cross-section of such an intake taken normal to its length will correspond to any of the accompanying drawings.

I claim:

1. An intake for supersonic flow comprising a center body and a wall spaced therefrom; said center body and wall being shaped to define between them a flow path including, in the direction of flow, a convergent section, a throat and a divergent section, the convergent section and throat being inclined outwardly with respect to the axis of the intake; said center body being formed with two opposed cusp portions spaced from one another in the direction of flow and defining between them an undercut recess shaped to permit the formation therein of a vortex bearing, the tip of the downstream cusp portion lying at said throat and a peripheral portion of said vortex bearing between said cusp portions partly defining said convergent portion of the flow path immediately upstream of said throat; and means mounting said downstream cusp portion for movement in the direction of flow away from the upstream cusp portion to enlarge the area of said throat and reduce the convergence of said convergent section.

2. An intake ascending to claim 1 wherein the center body comprises a forward part which extends upstream of the forward edge of said wall and is contoured to direction compression waves towards said forward edge.

3. An intake for supersonic flow comprising inner and outer walls shaped to define between them a flow path including, in the direction of flow, a convergent section, a throat and a divergent section, the convergent section being inclined outwardly with respect to the axis of the intake and the throat and divergent section being inclined inwardly; said inner wall being formed with two opposed cusp portions spaced from one another in the direction of flow and defining between them an undercut recess shaped to permit the formation therein of a vortex bearing, the tip of the downstream cusp portion lying at said throat; and means mounting said outer wall for movement in a downstream direction with respect to the inner wall to enlarge the area of the throat and reduce the convergence of the convergent passage.

References Cited in the file of this patent

UNITED STATES PATENTS

| | | |
|---|---|---|
| 2,206,193 | Kadenacy | July 2, 1940 |
| 2,663,140 | Price | Dec. 22, 1953 |
| 2,899,150 | Ellis | Aug. 11, 1959 |
| 2,931,167 | Leduc | Apr. 5, 1960 |

OTHER REFERENCES

Kantrowitz: "Stabilization of Shock Waves in Channel Flow," "Journal Of The Aeronautical Sciences," May 1950, v. 17, No. 5, pages 316, 317.